Aug. 26, 1924.
A. T. KASLEY
REFRIGERATOR
Filed Feb. 4, 1921
1,506,530
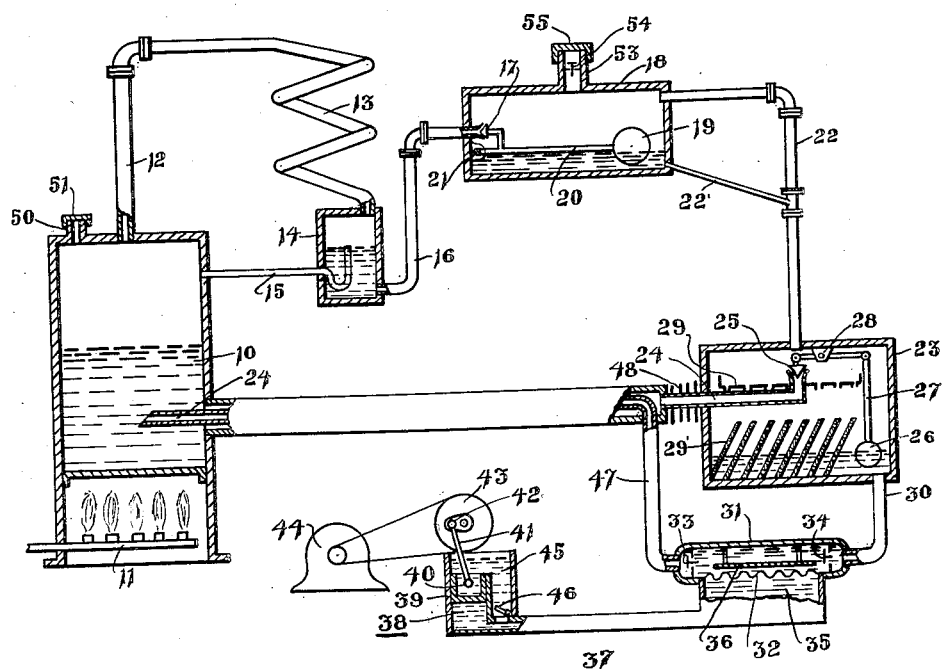
A.T.Kasley
INVENTOR
BY
D.C.Davis
ATTORNEY Patented Aug. 26, 1924.

1,506,530

UNITED STATES PATENT OFFICE.

ALEXANDER T. KASLEY, OF ESSINGTON, PENNSYLVANIA, ASSIGNOR TO WESTING-HOUSE ELECTRIC AND MANUFACTURING COMPANY, A CORPORATION OF PENNSYLVANIA.

REFRIGERATOR.

Application filed February 4, 1921. Serial No. 442,497.

*To all whom it may concern:*

Be it known that I, ALEXANDER T. KASLEY, a citizen of the United States, and a resident of Essington, in the county of Delaware and State of Pennsylvania, have invented a new and useful Improvement in Refrigerators, of which the following is a specification.

My invention relates to refrigeration and it has for its object the provision of a novel process and means of refrigeration which shall operate upon the well known absorption principle, which shall be continuously operative and in which all parts of a closed cycle shall be hermetically sealed.

The single figure in the accompanying drawing is a diagrammatic view of my improved refrigeration apparatus.

Refrigeration devices of the character designated depend for their operation upon the affinity of certain fluids for each other. These fluids should have, in addition, widely divergent boiling points so that the more volatile fluid may be readily driven off by evaporation from the other by the application of heat without causing any considerable quantity of the second fluid to be carried along with the more volatile fluid. The more volatile fluid, generally termed the refrigerant, may be any one of a number of media, of which ammonia, carbon dioxide, sulphur dioxide and water are commonly used. The other fluid, termed the absorbent, may also be chosen from a wide range of suitable media, water and hygroscopic salts being commonly used. The apparatus illustrated has been designed for the use of water as a refrigerant and a solution of caustic potash as an absorbent and my invention is described with reference to these fluids. It is to be understood, however, that my novel refrigerating apparatus is adapted to operate with any other fluids commonly used in two-fluid absorption refrigeration apparatus.

One of the chief difficulties experienced in the operation of absorption devices using volatile refrigerants is the escape of the volatile fluid from the apparatus if operated at higher than atmospheric pressure, or a leakage of air into the apparatus if operated at lower than atmospheric pressure. In systems of the character employing a continuous cycle, a pump is a necessary part of the system, and it is about this structure that leakage of the refrigerant usually occurs. To overcome these difficulties I have devised an apparatus which operates upon a continuous cycle and which eliminates all stuffing boxes and other packing of fluid containing parts and permits all joints and connections throughout the entire cycle to be hermetically sealed, as, for example, by welding, thus avoiding the possibility of leakage of any of the fluids employed in the refrigeration process.

Referring to the drawing for a more complete description of my novel refrigeration apparatus, I show a distilling device or concentrator at 10 which may be of any suitable structure adapted to cause the evaporation of the refrigerant by the application of heat, as by means of a fluid fuel burner 11. Regarding water as the refrigerant and caustic potash solution as the absorbent, it will be apparent that water vapor or steam, preferably at about atmospheric pressure, is delivered from the concentrator 10 through a pipe 12 to a condenser 13 which may comprise a series of coils cooled by the air, or other suitable form of condenser may be used. The vapor condensing in the coils 13 is collected in a tank 14 which may be provided with an overflow connection 15 to the concentrator 10 for the purpose of maintaining the liquid in the tank 14 below a predetermined level. Extending from the bottom of the tank 14 is a pipe 16 which leads to an expansion valve 17, preferably located in an evaporation tank 18. The opening and closing of the valve 17 is controlled by a float 19 which may be operatively connected to the valve in any suitable manner. As shown, the float 19 is secured to one end of a valve lever 20 which is pivoted at the other end to a fulcrum 21 secured to the tank 18.

A pipe 22 leads from the upper portion of the evaporation chamber 18 and enters the top of an absorption chamber 23. A small pipe 22' permits a small amount of water constantly to flow from the chamber 18 in order to prevent the liquid therein from becoming concentrated as a result of some of the caustic being carried over with the water vapor. A pipe 24 connects the concentration tank 10 with the chamber 23 into which the pipe 24 extends. A float controlled spray valve 25 is arranged at the end of the pipe 24 and serves to regulate the flow of the absorbent from the concentrator 10. As shown, a float 26 is attached to a valve lever 27 which is pivoted to the absorber tank at 28. The absorbent sprayed from the valve 25 is caught in a perforated pan 29 from whence it sprays downwardly through the absorbent chamber upon a plurality of porous plates 29'.

A pipe 30 conducts the caustic solution in which the water has been absorbed from the absorbent chamber 23 to a pump chamber 31 one wall of which is formed by a flexible diaphragm 32. Within the chamber 31, above the diaphragm 32, a plate 36 is secured to limit the deflection of the diaphragm and thus prevent a rupture thereof. The inlet and outlet passages of the chamber are provided with check valves 33 and 34 in a manner commonly in practice in expansible chamber pumps.

A chamber 35 is situated contiguous to the chamber 31 and is separated therefrom by the diaphragm 32. A pipe 37 connects the chamber 35 with a diaphragm operating mechanism. The mechanism 38 comprises a cylinder 39 in which a plunger 40 is loosely fitted and is arranged to reciprocate. The plunger is driven by a connecting rod 41 and crank 42 connected to a pulley 43 which in turn is driven by a motor 44. The chamber 35, cylinder 39 and pipe 37 are filled with a pressure transmitting fluid, such as oil. An overflow chamber 45 communicates with the upper portion of the cylinder 39 and with the pipe 37. A check valve 46 opening upwardly within the chamber 45 permits the flow of oil from the pipe 37 to the overflow chamber upon the down-stroke of the piston.

Leading from the chamber 31 is a pipe 47 which connects the chamber 31 with the concentrator 10. The pipe 47 may extend concentrically within the pipe 24, forming a concentric heat exchange apparatus. The concentric pipes 24 and 47 should be preferably made of such a length as to secure the maximum heating of the weak solution in the pipe 47 and a maximum cooling of the strong solution in the pipe 24. This can be accomplished by coiling the concentric pipes 24 and 47 in any suitable manner. A portion of the pipe 24 may also be provided with spaced annular discs 48 which serve to increase the heat transmitting surface and hence to cool further the strong solution flowing through the pipe 24.

The concentrator 10 may be supplied with a charging connection 50 which is closed by a suitable cap 51. The evaporation tank 18 may also be provided with a pump connection 53 in which is located an outwardly opening check valve 54. The connection is closed by a cap 55.

Having described the arrangement of an apparatus embodying my invention the operation thereof is as follows: In starting the apparatus a strong solution of caustic soda or potash is introduced into the distilling device 10 through the filling opening 50. A sufficient quantity of the solution should be used to fill the conduits 24 and 47, the chamber 31, the absorber 23 to the level permitted by the float and the distilling device 10 to a predetermined high level. The cap 51 is then securely positioned, and the fluid pumped through the conduits 24 and 47 to insure that these connections are free of air pockets. A vacuum pump is then attached to the connection 53, and since no liquid is contained in the chambers 14 and 18, the air is readily exhausted from the entire apparatus. The circulation of the caustic solution through a distilling device and the absorber permits the entrained and dissolved air in the solution to be also withdrawn. The connection 53 is sealed with the cap 55 and the apparatus is ready for operation.

Heat is applied to the concentrated caustic solution in the distilling device 10, distilling water from the solution and leaving a more saturated solution in the concentrator 10. The water vapor passes to the condenser 13 where the steam, preferably at a pressure not exceeding atmospheric pressure, is condensed, the condensate collecting in the chamber 14. The distillation of the water vapor is preferably more rapid than the absorption and provision is made for the return of any excess water to the concentrator through the pipe 15.

Since a normal pressure of $\frac{1}{10}$ pound absolute exists in the evaporator 18, the pressure differences between the chambers 14 and 18 are sufficient to cause a fine spray to be discharged through the expansion valve 17 into the evaporator 18, the spray greatly facilitating evaporation. Condensate collecting in the bottom of the tank 18 is likewise subject to low absolute pressures and evaporation therefrom is at all times active. The drain 22' withdraws small quantities of the liquid from the bottom of the evaporator and prevents this condensate from becoming concentrated. The float controlled expansion valve 17 serves to regulate the amount of condensate sprayed into the tank 18 so that it is equal to the amounts evaporated and withdrawn through pipe 22'. The heat necessary for the evaporation is drawn from the condensate and from the medium surrounding the tank 18, which may be said to be the cold body of the refrigeration apparatus.

The water vapor passes from the tank 18 to the absorber 23 where it is absorbed in a strong caustic solution. The caustic solution from the concentrator 10 enters the absorber through the pipe 24 and the float-controlled spray valve 25. Provision is made for presenting extended surfaces of the solution to the vapor, first by causing the solution to be sprayed through the top of the tank 23, then by being sprayed through the perforated bottom of the pan 29 and finally by being passed over the porous plates 29′. The vapor is by these agencies readily absorbed due to the strong affinity of water vapor for the caustic. The float 26 maintains within the tank 23 a sufficient amount of solution to insure a suitable head for the operation of the pumping chamber 31.

The caustic solution, weakened by the absorption of the water vapor, is led by the pipe 30 to the expansible chamber 31. The flexible wall 32 of this chamber is subjected to the pressure of the liquid, preferably oil, within the chamber 35. The reciprocation of the piston 40 causes a succession of relatively high and low pressures to be transmitted through the liquid, producing an inward and outward movement of the diaphragm 32 which, cooperating with the check valves 33, 34, produces a pumping action upon the fluid within the chamber 31 and causes a flow of caustic solution from the absorber 23 to the concentrator 10.

The diaphragm operating device may preferably operate so that upon a downstroke of the piston 40, oil may escape past the check valve 46 into the overflow chamber 45. The oil, and consequently the flexible wall 32, is then submitted to atmospheric pressure which holds the diaphragm 32 inwardly against the plate 36, the pressure in the chamber 30 being at all times less than atmospheric pressure. Upon an upstroke of the piston a reduced pressure is produced in the oil containing chambers withdrawing the flexible wall 32 downwardly from the plate 36. During the upstroke of the piston, some oil is forced, by the superior atmospheric pressure acting upon the surface of the oil above the piston, down past the piston into the cylinder. In this manner a succession of relatively high and low pressures is produced in the oil containing chambers which results in the inward and outward movement of the flexible wall 32.

The dilute solution discharged from the expansible chamber 31 is led by the pipe 47 concentrically through the pipe 24 to the concentrator 10. This construction serves a two-fold purpose; it preheats the dilute solution in pipe 47 before its entrance to the concentrator and it cools the concentrated solution passing through the pipe 24 from the concentrator 10 to the absorber 23. Additional means of cooling the concentrated solution in the pipe 24 may be employed. As illustrated, fins 48 secured to the pipe 24 serve to facilitate the cooling of the solution passing therethrough.

The above described refrigeration apparatus possesses many advantages over similar devices now in use. It avoids high pressures, pressures within the system lower than atmospheric pressure being possible. It is formed of a plurality of connected chambers all of which are hermetically sealed against the escape of the refrigerating fluids and against the infiltration of air. It includes a positive and efficient pumping device that is leak-proof. When placed in operation, it may be operated an indefinite period without replenishing the supply of refrigerating fluids. Its efficiency is high and its cooling effect is easily regulated by controlling the flow of solution from the absorber to the concentrator.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:—

1. The process of refrigeration which comprises applying heat to a solution including a refrigerant fluid and an absorbent fluid in a container, whereby refrigerant vapor is driven off, condensing the refrigerant vapor, returning to the container any excess of condensed refrigerant, expanding the condensed refrigerant by delivering it into a region of low pressure, withdrawing a portion of the solution from the container into a separate vessel, cooling the solution withdrawn during its withdrawal, re-absorbing the expanded refrigerant in the cooled solution, and returning the weakened solution to the original container.

2. The process of refrigeration which comprises applying heat to a strong caustic solution in a container, whereby water vapor is driven off, condensing the water vapor, returning to the container any excess of condensate, expanding the condensed vapor by spraying into a region of low absolute pressure, withdrawing a portion of the strong caustic solution into a separate vessel, cooling the solution withdrawn during its withdrawal, absorbing the expanded vapor in the cooled caustic solution, returning the weakened solution to the original container and heating the weakened solution during its return passage, the cooling of the strong solution and the heating of the weakening solution being effected by a counter flow heat exchange between the fluids.

3. In an absorption refrigeration system, the combination of a distilling device, means for condensing the refrigerating agent distilled therein, means for returning to the distilling device any excess condensed refrigerating agent, an evaporator for vaporizing the condensate, an absorber receiving vapors from the evaporator and concentrated liquor from the distilling device and means for returning the weakened liquor from the absorber to the distilling device.

4. In an absorption refrigeration system, the combination of a distilling device, means for condensing the refrigerating agent distilled therein, means for returning to the distilling device any excess condensed refrigerating agent, an evaporator for vaporizing the condensate, an absorber receiving vapors from the evaporator, means for cooling the concentrated liquor during its passage from the distilling device to the absorber and means for returning the weakened liquor from the absorber to the distilling device.

5. In an absorption refrigeration system, the combination of a distilling device, means for condensing the refrigerating agent distilled therein, means for returning to the distilling device any excess condensed refrigerating agent, an evaporator for vaporizing the condensate, an absorber receiving vapors from the evaporator, means for cooling the concentrated liquor during its passage from the distilling device to the absorber and for heating the weakened liquor during its passage from the absorber to the distilling device.

6. In an absorption refrigeration system, the combination of a distilling device, means for condensing the refrigerating agent distilled therein, means for returning to the distilling device any excess condensed refrigerating agent, an evaporator for vaporizing the condensate, an absorber receiving vapors from the evaporator, means for cooling the concentrated liquor during its passage from the distilling device to the absorber and for heating the weakened liquor during its passage from the absorber to the distilling device, said means comprising a heat exchange device through which both the concentrated and weakened liquors flow.

In testimony whereof, I have hereunto subscribed my name this 31st day of January, 1921.

ALEXANDER T. KASLEY.